No. 120,372. John Eisele's Patented Oct. 31, 1871.

Improvements in
SHAFT COUPLINGS.

*Inventor.*
John Eisele

Witnesses.
Robert R. Smith
Adam Tefft

C. S. Whitman & Co.
Attorneys.

UNITED STATES PATENT OFFICE.

JOHN EISELE, OF PHILADELPHIA, PENNSYLVANIA.

IMPROVEMENT IN SHAFT-COUPLINGS.

Specification forming part of Letters Patent No. 120,372, dated October 31, 1871; antedated October 14, 1871.

*To all whom it may concern:*

Be it known that I, JOHN EISELE, of Philadelphia, in the county of Philadelphia and State of Pennsylvania, have invented certain Improvements in Shaft-Couplings, of which the following is a specification.

Figure 1:
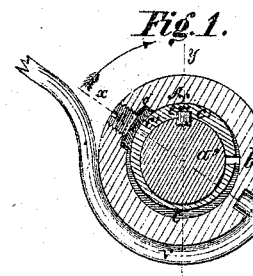
Figure 2:
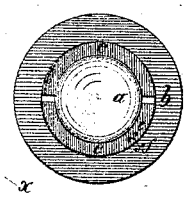
Figure 3:
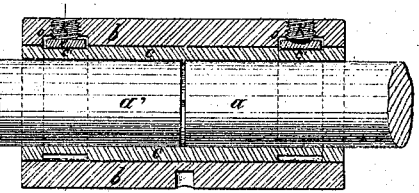
Figure 4:
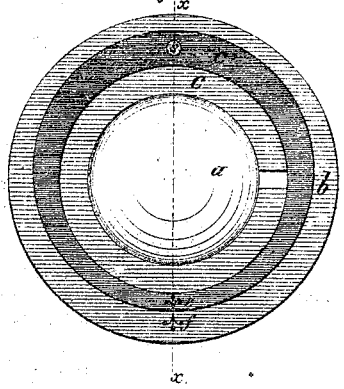
Figure 5:
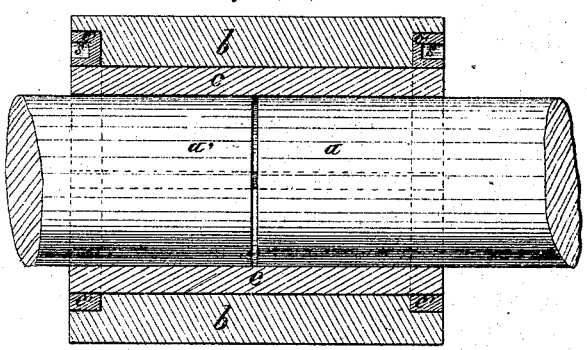
Figure 6:
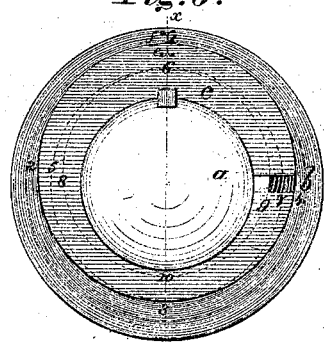
Figure 7:
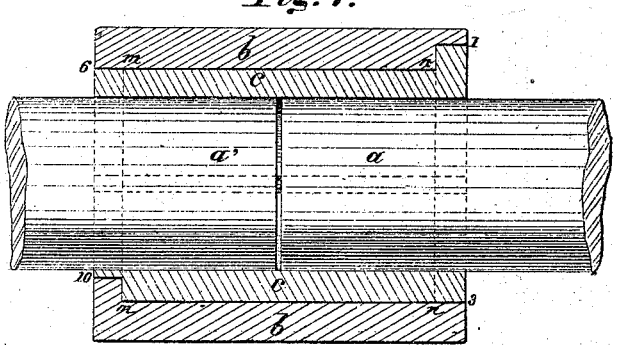
Figure 10:
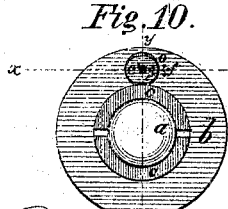
Figure 8:
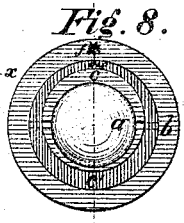
Figure 9:
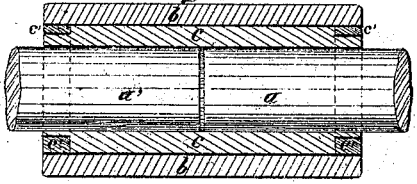

This invention relates to that class of couplings which is not keyed tightly upon the shafts like the common plate coupling, but are intended to be easily removed for the purpose of attaching pulleys, &c., to the shafting and taking the same off. Various difficulties have heretofore been met in the practical use of these couplings, the most prominent among which were—the want of accuracy in turning the ends of the shafts to be coupled of exactly the same diameter, the aptness of workmen to bore the hole for the shaft slightly conical instead of cylindrical, rust of working parts, difficulty in detaching the coupling when once fixed upon the shafts, and complication of small perishable parts, as bolts, keys, &c. My invention is intended to overcome these difficulties, as my improved coupling may be made of the smallest possible number of pieces, namely, two, and as there are no bolts or keys used for tightening. The adjusting-screws which I use in one form of the improved device are not used for fastening the coupling upon the shafts, but remain stationary when the heavy strain of this process comes upon them, so that their bearing-surfaces are not injured thereby. The essential features of my invention are, the combination of two pipes or sleeves, one intended to fit the shafts freely, and the other to fit over the outside of the first. I then provide the exterior surface of the inner sleeve, or the interior surface of the outer sleeve, or both, with cam-shaped or eccentric surfaces in such a manner that, by the revolution of either sleeve, or by the revolution of cams, the inner sleeve is compressed tightly upon the shaft. In another form I make both sleeves concentric cylinders, and produce the compression by cams whose center of revoluion lies outside of the shaft. I also make use of certain marks on the parts, so as to facilitate the putting together in the right position. Before proceeding with a detailed description I will give a general outline of the invention, and for that purpose will class the different modifications under the following divisions:

Figures 1, 2, and 3: The exterior surface of the inner sleeve $c$ is partially concentric with the bore and partially eccentric or cam-shaped, and the interior surface of $b$ is concentric with the shafts $a\ a'$ through its entire length, but is provided with pins, knobs, shoes, or like projections, which are intended to work in conjunction with the cam-shaped surface on $c$. Figs. 4 and 5: The exterior surface of the inner sleeve $c$ is concentric with the shafts $a'\ a'$, and has neither cams nor projections. The outer sleeve $b$ is bored out to fit freely over the inner cylinder $c$, and is also provided on its inner surface with cam-shaped or eccentric recesses. Into these recesses cams or eccentrics $c'\ c'$ are fitted, and by revolving the latter the inner sleeve is tightened. Figs. 6 and 7: The exterior surface of the inner sleeve $c$ is in part concentric with its bore and in part cam-shaped or eccentric. The interior surface of the outer sleeve $b$ is also in part concentric, and in part cam-shaped or eccentric, so that the interior surface of $b$ shall be an exact counterpart of the exterior surface of $c$. The inner sleeve is contracted by revolving either sleeve, and keeping the other stationary. Figs. 8 and 9 are the reverse of Figs. 4 and 5, the outer sleeve being concentric, as also part of the inner sleeve $c$. The latter is in addition provided with cam-shaped recesses, into which cams or eccentrics are fitted. Its operation is similar to Figs 4 and 5. Fig. 10: The cylinders $c$ and $b$ are both concentric with the shafts $a\ a'$, but either the inner or outer sleeve is provided on each end with a recess, into which a cam is fitted in such a manner that when it is revolved it will come in contact with $c$ and force the latter against the shafts.

Fig. 1 is a section through the line $z\ z$, Fig. 3, showing adjustable shoes $i$, bearing upon the cam-shaped surface $c$. Fig. 2 is an end view, where permanent pins, lugs, or other projections take the place of the adjustable shoes shown in Fig. 1. Fig. 3 is a longitudinal section through the line $x\ x$, Fig. 1.

If the ends of the shafts $a\ a'$ in this coupling, as well as the other modifications, were mathematically alike in their diameters, only one of the cam-shaped surfaces $c'$, shoes $i$, and adjusting-screws K would be required about the middle of the length of the coupling; but such being in practice unattainable, two are provided, one at or near each end of the coupling. The recesses $o\ o$ in the interior of $b$ are wide and long enough to allow the shoe $i$ to enter freely, and their depth is somewhat greater than the thickness of the shoes is, so that, with the screws K K removed, no part of the shoe shall project past the interior surface of $b$, so as not to obstruct the introduction of the sleeve $c$. When $a\ a'$, $b\ c$, and $i\ i$ are all in their proper position, as shown in Figs. 1 and 3, the screws K K are introduced and screwed against the back of the shoes $i\ i$ until the latter just touch the cam-shaped surface $c'$ on the sleeve $c$. Now we apply a "spanner," $v$, to the outer sleeve, and, keeping the sleeve $c$ stationary, revolve $b$ in the direction of the arrow, Fig. 1, whereby the shoes $i\ i$ are forced up the cam-shaped surface $c'$ and thereby compress the sleeve $c$ tightly upon the shafts $a\ a'$, $c$ having a slit through its entire length to allow said compression. By keeping $b$ stationary and revolving $c$ in the opposite direction from the arrow the same result follows. If it is found that one of the shafts is not tightened enough the coupling should be brought back to the position shown in Fig. 1, the shoe on the loose end screwed a little tighter against $c'$, and then the sleeves revolved again over each other as before. The ends of the screws K K bearing against the shoes $i\ i$ should be sections of balls, fitting into corresponding ball-shaped sockets on the back of the shoes $i\ i$, as the right-hand one in Fig. 3, so that the shoes may accommodate themselves to any variations in the curvature of the cam-shaped surface $c'$. In Fig. 2, instead of the adjustable shoes $i\ i$ a permanent lug, $i$, which may be a pin, screw, or other projection, is shown; and in order to be able to introduce the sleeve $c$ a slot, $r$, somewhat larger than $i$, is cut from one end of the sleeve to both chamfered surfaces. Fig. 4 is an end view of a coupling whose inner sleeve $c$ is a concentric cylinder. Part of the outer sleeve $b$ is bored concentric to fit over $c$, but at the ends $b$ has eccentric recesses, into which eccentric cams $c'\ c'$ fit. Fig. 5 is a longitudinal section of this coupling. When cams $c'\ c'$ are put into their recesses their bore and that of the sleeve $b$ should come exactly in line, so that the sleeve $c$ can be introduced. After doing this the sleeve $c$ may be tightened upon the shafts $a\ a'$ by changing the relative position of $c'\ c'$ and $b$—that is, by revolving either. Fig. 6 is a coupling having concentric and also cam-shaped surfaces on the inner sleeve, and the interior surface of $b$ is made to correspond. Fig. 7 is a longitudinal section of the same. The sleeve $c$, whose bore corresponds, as in all the cases, with the diameter of the shafts $a\ a'$, has part of its length, from $m$ to $n$, Fig. 7, turned concentric with the bore, as is indicated by the dotted circle 6 5 3 7, Fig. 6; but toward the end of the sleeve this concentric form ceases and eccentrics take its place. The small eccentric on the left of Fig. 7, represented in Fig. 6 by the dotted circle 6 8 10 9, must fall entirely within the circumference of the concentric part 6 5 3 7, and the large cam must be made to fall entirely outside the concentric part 6 5 3 7, as shown by the circle 1 2 3 4, Fig. 6, so that $c$ can be introduced into $b$ from the right hand, Fig. 7. If the diameters of the cams are not made in this way the coupling cannot be made in two pieces, $c$ and $b$, as in order to be able to put the whole together one of the cams—namely, the large one—would have to be a separate piece. The outer sleeve $b$ has its interior bored out to go over every part or $c$ that is to fit not only the central concentric part but also the cams on the ends. If the sleeve $c$ was concentric with the shafts $a\ a'$ throughout its whole length it would revolve in the sleeve $b$ and around the shafts $a\ a'$ without any result; but, on account of the eccentric surfaces, it must contract diametrically while it revolves, and thereby it tightens upon the shafts $a\ a'$, a slit, as before described, being provided to allow said contraction. Fig. 8 is a coupling, the construction of which is just the reverse of that shown in Fig. 4. Fig. 9 is a longitudinal section of the same. The outer sleeve $b$ of this coupling is bored concentric with the shaft throughout its entire length. The sleeve $c$ and cams $c'\ c'$ are turned externally, to fit the bore of $b$. The hole in the cams is bored eccentric, to correspond with and fit on the eccentric ends of the sleeve $c$. As the operation is similar, although reverse to that of Figs. 4 and 5, any further description will be unnecessary. Fig. 10 is an end view of a coupling in which the center of revolution of the cams $c'$ lies outside of the shafts $a\ a'$. The sleeves $c$ and $b$ are both concentric cylinders. Either one may be provided at each end with a circular recess, $o$, in such a manner that a slight portion of the edge of said recess shall be taken up by the other sleeve, as shown in Fig. 10, where the sleeve $c$ takes a little off the lower part of $o$. On the line $x\ x$ the cam $c'$ just fills the recess; hence, by revolving it to the line $y\ y$ it comes in contact with that part of the sleeve $c$ which projects into the recess, and thereby the sleeve $c$ is tightened upon the shaft.

The eccentricity of the cams $c'\ c'$, is for the sake of clearness, made far greater in the drawing than I use. In practice it is so small that to a casual observer the cam-shaped or eccentric surfaces would appear concentric. Now, from the foregoing description, it will be seen that the parts of these couplings must be put together in a certain position, namely, with all the cams on their line of "dead center" $x\ x$—that is, on that line where the motion which they impart reverses. In order to find this point at a glance, I provide the cams $c'\ c'$ with a mark, $e$, and put also a mark, $f$, on the part with which the cam works. These marks may be cut or cast in, painted, or they may be produced in any other convenient way. In Figs. 1, 4, 6, 8, and 10 these marks will be found on the lines $x\ x$, and in Fig. 2 in a different position.

I am aware that screws similar to K K have been used before in couplings, but to the best of my knowledge and belief they were not used for the same purpose. I am also aware that eccentrically-bored wedges or cams, both alone and in combination with set-screws, have heretofore been used. (See the patent granted to E. G. Shortt, September 28, 1869.) I therefore do not claim the sense generally, but limit myself to the specific devices claimed in the following clauses, that is to say:

1. A shaft-coupling produced by the combination of the sleeve $c$, part of whose exterior surface is concentric with its bore and shafts $a\ a'$ and part of it cam-shaped or eccentric, the sleeve $b$, recesses $o\ o$, shoes $i\ i$ or their equivalents, adjusting-screws K K, and shafts $a\ a'$, substantially as and for the purpose set forth.

2. A shaft-coupling produced by the combination of the sleeve $c$, whose exterior surface is concentric with its bore throughout its whole length, the sleeve $b$, part of whose inner surface is concentric with the sleeve $c$ and part of it eccentric, and cams $c'\ c'$, substantially as and for the purpose herein specified.

3. A shaft coupling produced by the combination of the sleeve $c$, part of whose exterior surface is concentric with the bore, as 6 5 3 7, and part of it cam-shaped or eccentric, as shown by circles 1 2 3 4 and 6, 8, 10, and 9, sleeve $b$, having cam-shaped or eccentric and concentric surfaces corresponding with those on $c$, substantially as and for the purpose herein specified.

4. A shaft-coupling produced by the combination of the sleeve $b$, whose entire inner surface is concentric, sleeve $c$, part of whose exterior surface is concentric with its bore and part of it cam-shaped or eccentric, cams $c'\ c'$, and shafts $a\ a'$, substantially as and for the purpose specified.

5. A shaft-coupling produced by the combination of the concentric sleeves $c$ and $b$, circular recess $o$, cam $c'$, and shafts $a\ a'$, substantially as and for the purpose herein specified.

In testimony that I claim the foregoing I have subscribed my name this 10th day of November, 1870.

JOHN EISELE.

Witnesses:
ROBERT R. SMITH,
ADAM TUFTS. (87)